UNITED STATES PATENT OFFICE.

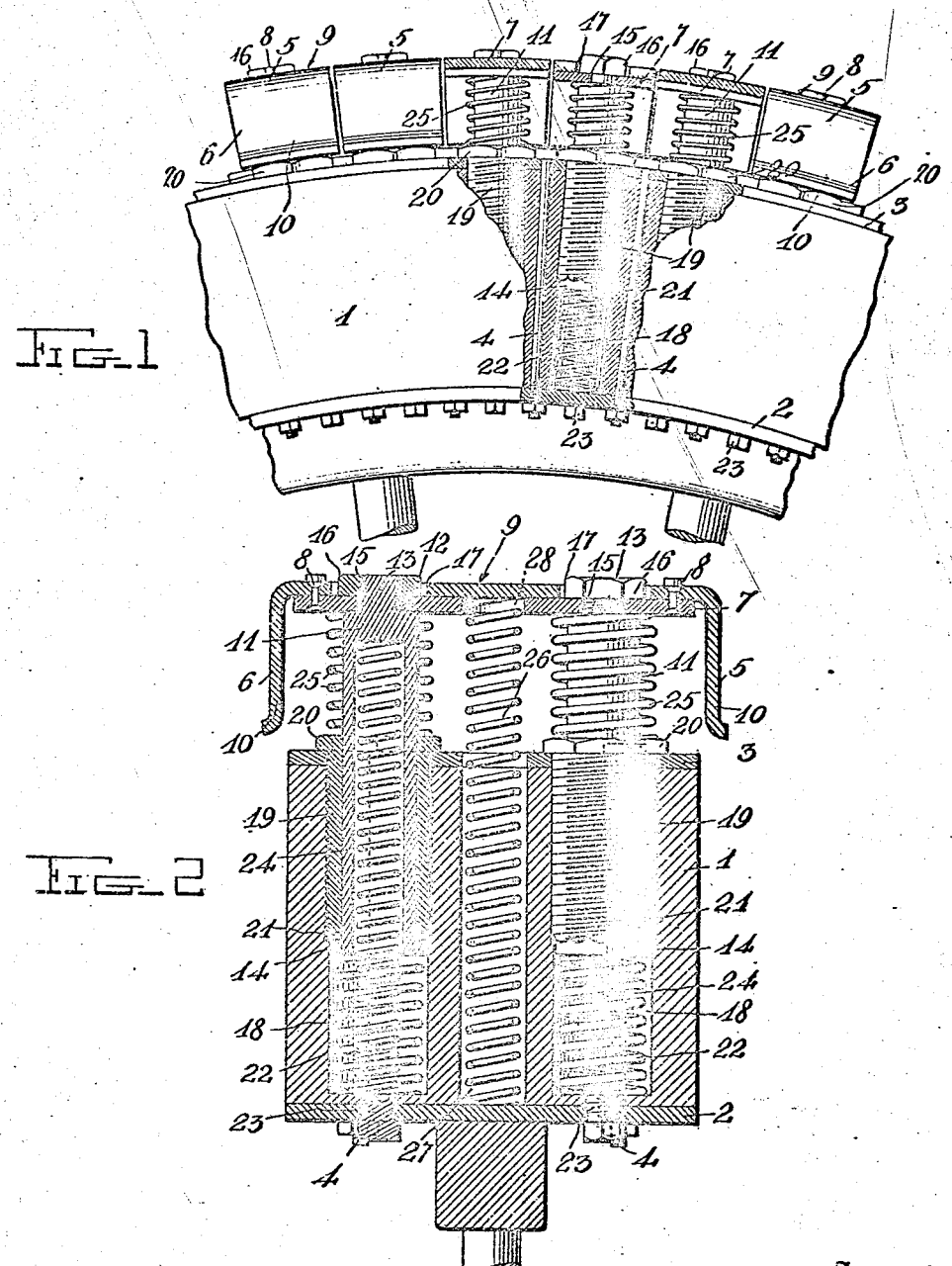

JOHN G. SMITH, OF WAHOO, NEBRASKA.

CUSHION-TIRE.

No. 899,139.　　　Specification of Letters Patent.　　　Patented Sept. 22, 1908.

Application filed March 18, 1907. Serial No. 362,898.

*To all whom it may concern:*

Be it known that I, JOHN G. SMITH, a citizen of the United States, residing at Wahoo, in the county of Saunders and State of Nebraska, have invented certain new and useful Improvements in Cushion-Tires; and I do declare the following to be a full, clear, and exact description of the invention, such as will enable others skilled in the art to which it appertains to make and use the same.

My invention relates to improvements in cushion tires for the rims of automobiles and also adapted for use on the wheels of other vehicles, and it consists in the construction, combination and arrangement of devices hereinafter described and claimed.

In the accompanying drawings,—Figure 1 is partly an elevation and partly a sectional view of a portion of a cushion tire embodying my improvements; and Fig. 2 is a transverse sectional view of the same.

In accordance with my invention, I provide a suitable inelastic rim, which is here shown as composed of an intermediate wooden rim 1, an inner iron or steel rim 2, and an outer iron or steel rim 3, said rims 1, 2 and 3 being secured together by bolts 4. Around the said outer rim are a series of radially-movable spring cushion tread elements 5, each of which is independent of all the others, and comprises an outer, substantially U-shaped portion 6 and an inner reinforced portion 7, which extends across the central portion thereof and is secured thereto, as by means of rivets 8 and the nuts 16, hereinafter referred to, on the outer ends of plungers 11. Each of the said tread elements has a tread face 9 and arms 10, which arms are disposed slightly without the planes of the sides of the inelastic rim. In connection with each tread member are employed a pair of plungers 11. The said plungers are of tubular form, have their outer ends closed, formed with shoulders 12 and with a screw-threaded projection 13, and their inner ends are open and are provided with exterior annular flanges 14. The screw-threaded projections 13 extend through openings 15 in the inner re-inforced portion 7 of the tread members, and nuts 16 are secured on the said projections and are slightly countersunk in openings 17 in the outer portions 6 of the tread members. The rivets 8 and the nuts 16 project from the tread members, increase the tractive power of the wheel, and also serve to prevent skidding.

Openings 18, which are radial with reference to the wheel, extend through the wooden member 1 of the rim and the outer rim 3. In the said openings are secured exteriorly-threaded, tubular guide sleeves 19, which have polygonal hubs 20, adapted to be engaged by a wrench and to bear on the outer side of the outer rim 3. It will be observed by reference to the drawings that the said guide sleeves extend only partly through the openings 18 and that the plungers operate in the said guide sleeves. The inner ends of said guide sleeves are serrated, as at 21, and are engaged by the flanges 14 of the plungers when the latter are forced outwardly by the springs hereinafter described. The said flanges 14 at the inner ends of the plungers 11 operate in the inner portions of the openings 18. In the said inner ends of the openings 18 are springs 22, which bear against the inner ends of the plungers and also against the rim 2 at points around plugs 23 which are secured in openings in the inner rim coincident with said openings 18. Smaller springs 24 are also employed, each of which has its outer portion in the bore of one of the plungers and its inner portion within and spaced from one of the springs 22 and bearing against the inner rim 2 around one of the plugs 23. The said springs coact with the springs 22 to press the plungers and hence also the tread members outwardly and to yieldably support the tread members. On the outer portion of each plunger 11 is a spring 25, which bears between the inner side of one of the tread members and the outer end or head of one of the guide sleeves. These springs 25 also coact with the springs 22 and 24.

I employ a pair of plungers, guide sleeves and their coacting springs, in connection with each tread member, and between the said pairs of guide sleeves and plungers I employ also a reinforcing spring 26, the inner end of which is in an opening 27 in the wooden rim 1, a registering opening in the outer rim, and the outer end of which is seated in an opening 28 in the inner part 7 of the tread member. It will be understood that the tread members are normally projected from the rim and are cushioned by the springs hereinbefore described, so that said tread members as they successively engage the ground or surface on which the wheel operates, permit the cushion tire to yield and enable the vehicle to ride easily. The bolts 4, which are employed to secure the inner and outer rims 2, 3, to the intermediate wooden rim 1, are disposed between the guide sleeves 19 of adjacent tread members and the heads of said bolts being interposed between the heads of said guide sleeves serve to lock the latter and prevent them from turning and working loose in the screw-threaded portions of the openings 18. The serrated inner ends of the guide sleeves against which the flanges 14 of the plungers strike, prevent the clicking sounds which would otherwise result from the concussion of such plungers and guide sleeves. The plugs 23 enable oil to be placed in the openings 18 to lubricate the plungers and guide sleeves.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent is,—

1. A cushion tire comprising a rim having a series of radially movable spring-cushioned tread elements arranged therearound in openings therein, and each comprising an outer approximately U-shaped member with an inner re-inforcing member secured thereto, and a plurality of spring-pressed plungers secured at one end to each of said tread elements and operable at their other ends in said rim.

2. A cushion tire comprising a rim having a series of radially movable spring-cushioned tread elements arranged therearound in openings therein, and each comprising an outer approximately U-shaped member with an inner re-inforcing member secured thereto, a plurality of tubular plungers having closed outer ends provided with reduced screw-threaded projections for engagement with said tread members, the inner ends of said plungers being open, springs arranged in said plungers and bearing on the bottoms of the openings in said rims, and larger springs arranged in said openings and surrounding said first named springs and bearing at one end on said plungers.

3. A cushion tire comprising a rim having a series of radially movable spring-cushioned tread elements arranged therearound in openings therein, and each comprising an outer approximately U-shaped member with an inner re-inforcing member secured thereto, a plurality of tubular plungers having closed outer ends provided with reduced screw-threaded projections for engagement with said tread members, the inner ends of said plungers being open and provided with exterior annular flanges, guide sleeves arranged in the openings in said rim and in which the plungers operate, the inner ends of said guide sleeves being serrated for engagement by the flanges on said plungers to prevent clicking resulting from connection of the plungers and the sleeves, and springs for forcing said plungers and the tread members connected therewith normally downward.

In testimony whereof I have hereunto set my hand in presence of two subscribing witnesses.

JOHN G. SMITH.

Witnesses:
ERNEST HANSON,
OSCAR HANSON.